（12）United States Patent
Osterkamp et al.

(10) Patent No.: US 12,418,545 B1
(45) Date of Patent: Sep. 16, 2025

(54) TEST DATA MANAGEMENT ECOSYSTEM

(71) Applicant: United Services Automobile Association (USAA), San Antonio, TX (US)

(72) Inventors: Bryan J. Osterkamp, New Braunfels, TX (US); Sushil Swarnapuri, Cypress, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 505 days.

(21) Appl. No.: 17/826,904

(22) Filed: May 27, 2022

(51) Int. Cl.
| | |
|---|---|
| *H04L 9/40* | (2022.01) |
| *G06F 16/23* | (2019.01) |
| *G06F 21/31* | (2013.01) |
| *G06F 21/50* | (2013.01) |

(52) U.S. Cl.
CPC ...... *H04L 63/1408* (2013.01); *G06F 16/2379* (2019.01); *G06F 21/31* (2013.01); *G06F 21/50* (2013.01); *H04L 63/101* (2013.01)

(58) Field of Classification Search
CPC ...... G06F 21/2379; G06F 21/21; G06F 21/31; G06F 21/50; H04L 63/10; H04L 63/101; H04L 63/1408
See application file for complete search history.

(56) References Cited

U.S. PATENT DOCUMENTS

| | | | | |
|---|---|---|---|---|
| 10,481,981 | B2* | 11/2019 | Wiegenstein | G06F 11/3051 |
| 11,573,955 | B1* | 2/2023 | James | G06F 16/2228 |
| 2006/0271640 | A1* | 11/2006 | Muldoon | A61B 5/0002 709/217 |
| 2021/0026761 | A1* | 1/2021 | Duffy | G06F 11/368 |
| 2024/0054590 | A1* | 2/2024 | Takahashi | G06Q 50/205 |
| 2024/0169082 | A1* | 5/2024 | Bond | G06F 21/6218 |

\* cited by examiner

*Primary Examiner* — Shaqueal D Wade-Wright
(74) *Attorney, Agent, or Firm* — Fletcher Yoder, PC

(57) ABSTRACT

A test data management ecosystem allows for a distributed test data management application. The distributed test data management application includes a core component and multiple satellite components performing coordinated operations to manufacture test data and convey the manufactured test data to end users. The distributed test data management application decentralizes the test data manufacturing to the satellite components, which report to the core component with metadata associated with the manufactured test data. The test data management ecosystem also includes multiple user interfaces and application programming interfaces to support various functionalities of the test data management ecosystem, such as test data manufacturing, managing, governing, tracking, and provisioning.

20 Claims, 7 Drawing Sheets

TEST DATA MANAGEMENT ECOSYSTEM

BACKGROUND

The present disclosure relates generally to systems and methods related to manufacturing test data at a large scale. More specifically, the techniques discussed herein relate to a test data management system using distributed components to manufacture test data and convey the manufactured test data to end users.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As digitalization becomes more prevalent, more organizations are using test data to facilitate or improve various functions and operations of the organizations. For instance, an organization may use the test data to validate an operation under design before implementing the operation in practice. In this way, potential issues or errors associated with the operation may be identified and corresponding solutions may be developed to improve the design of the operation. As such, issues and errors that may occur when the operation is implemented in practice may be prevented or reduced.

However, the organizations utilizing the test data may face new challenges to provide efficient management of the test data across various sectors (e.g., divisions, departments, or groups) operating in different areas and having different roles, objectives, needs, or data structures. For example, an enterprise may have a centralized test data management application to centrally manage manufacturing test data across several divisions within the enterprise. However, such centralized test data management application may lead to certain challenges, such as how to keep test data manufacturing capabilities up to date to accommodate or adapt to various changes (e.g., changes associated with objectives, needs, or structures) that may occur in different divisions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Provided herein is a decentralized test data management system that utilizes satellite test data components to manufacture test data, while also utilizing a centralized core component that each satellite component reports to. The satellite components provide information about manufactured test data enabling sharing of manufactured test data across silos.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
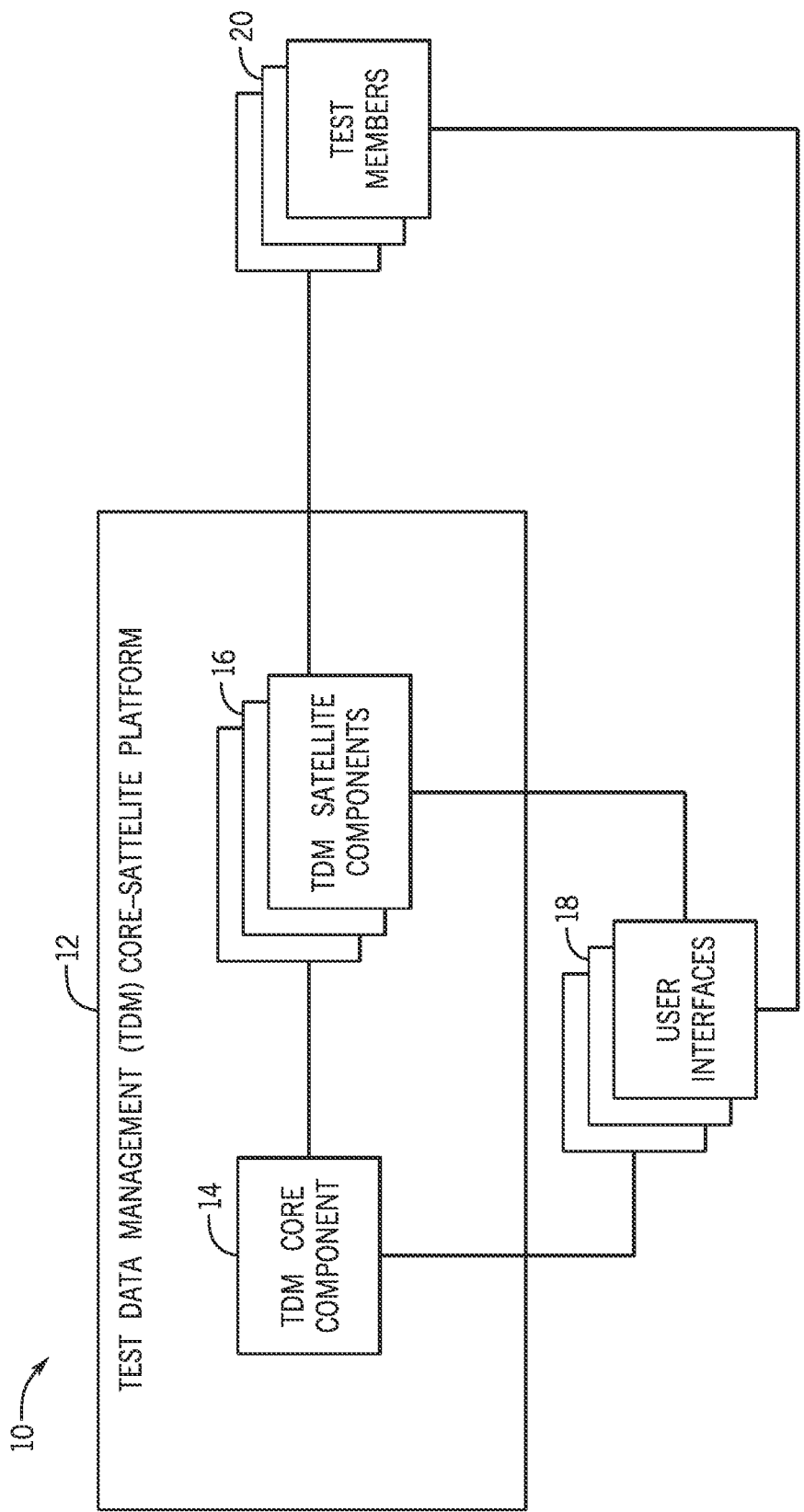
FIG. 1 illustrates a block diagram of a distributed test data management model including a core component and multiple satellite components, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As digitalization becomes more prevalent, more organizations are using test data to facilitate or improve various functions and operations of the organizations. For instance, an organization may use the test data to validate an operation under design before implementing the operation in reality. For instance, the test data may include a first set of test data and a second set of test data. The validation process may use a numerical model representative of the operation, to simulate operation in an implementation environment using the first set of test data as an input to feed the model. The second set of test data may be used to validate an output generated by the model through the simulation. In this way, potential issues or errors associated with an actual implementation of the designed operation may be prevented or reduced.

However, many organizations may have various sectors (e.g., divisions, departments, branches, or groups) set up with different goals and possesses with a vast array of different resources (e.g., production, management, software platform, or database). Such complexities may create challenges for the organizations to efficiently utilize (e.g., create, update, govern, track) the test data across various sectors that may operate in different areas and having different roles, objectives, needs, or data infrastructures. On one hand, different sectors within an organization may have common interests on certain aspects. The enterprise may have a centralized test data management (TDM) platform or application to centrally manage manufacturing test data across different sectors within the organization. With the centralized TDM platform or application, the organization may be able to maintain a common ground (e.g., standardized manufacturing and management of the test data), such that different sectors may share the test data across sector boundaries, therefore reducing duplicated work (e.g., creating separated test data that may share similar data portions or contents) and associated time and cost, and facilitating test data management (e.g., less test data logging/tracking).

On the other hand, the different sectors within the organization may request the TDM platform or application to provide sufficient data diversity to meet different interests or interest variations associated with individual sectors. Such requests may lead to certain challenges on the centralized TDM platform or application, such as keeping test data manufacturing capability up to date to accommodate or adapt to various changes (e.g., changes associated with objectives, needs, or structures) that may occur in different sectors. For instance, a centralized test data management team may be a separate team than actual teams (e.g., teams within individual sectors) having specific knowledge of how the test data should be manufactured at individual sector levels. In some cases, the test data created by the centralized test data management team may be problematic (e.g., invalid or out of date) such that the actual teams within individual sectors may not be able to use the test data to meet individual interests or goals.

For instance, an organization may have a variety of divisions including a bank division, an insurance division, and the like. Each division has specific interests (e.g., banking, insurance, data management). Additionally, each division may have subdivisions. For example, the banking division may include a saving/checking subdivision and a credit card subdivision. The insurance division may include a home insurance subdivision and an auto insurance subdivision. The divisions and subdivisions may use different test data generators (e.g., software platforms or applications) to create their own copies of test data to meet their individual interests. However, certain divisions/subdivisions may have common interested areas where shared test data may be used to perform at least a portion of operations (e.g., operation design, testing, and validation using the shared test data). For instance, the bank division and the insurance division may utilize similar test data containing pseudo/synthetic user data to perform certain operations, such as user behavior analysis, risk assessment, interest/rate simulation and prediction, and so on. In such cases, the bank division and the insurance division may use a centralized TDM application to create the test data that can be shared between the two divisions, therefore reducing time and cost related to manufacturing and/or managing the test data. The shared test data may include standardized data format, structure, and other data infrastructure-related features to enable the shared test data to be used across different divisions/subdivisions within the organization.

As the shared test data is used by more divisions/subdivisions and/or in more complex operation environment (e.g., added operation design complexity), individual divisions/subdivisions may wish to update the shared test data to meet respective interests. However, in certain cases, the shared test data updated or modified by one division/subdivision may not be compatible with the other divisions/subdivisions. One of the challenges on the centralized TDM application is to maintain data universality allowing the test data created by different entities (e.g., divisions/subdivisions) to be shared within the organization while providing sufficient data versatility and diversity allowing the different entities to perform different operations to meet different interests or goals.

Embodiments of the present disclosure are generally directed towards a test data management ecosystem allowing for a distributed test data management application based on a core-satellite platform. The distributed test data management application includes a core component and multiple satellite components performing coordinated operations to manufacture test data and convey the manufactured test data to end users (e.g., divisions or subdivisions within an organization). The distributed test data management application decentralizes the test data manufacturing to the satellite components, which report to the core component with metadata associated with the manufactured test data. The test data management ecosystem also includes multiple user interfaces (UIs) and application programming interfaces (APIs) to support various functionalities (e.g., test data manufacturing, governing, tracking, provisioning, terminating, and interactions with the end users) of the test data management ecosystem.

By way of introduction, FIG. 1 illustrates a block diagram of a distributed test data management model 10 including a test data management (TDM) core-satellite platform 12, user interfaces 18, and test members 20. The test data management core-satellite platform 12 may include a core component 14 and satellite components 16. The distributed test data management model 10 may decentralize the test data manufacturing to the satellite components 16, which report to the core component 14 with metadata associated with the manufactured test data. The metadata may allow the core component 14 to become aware of the test data and/or provide an indication to the user. The core component 14 and the satellite components 16 may communicatively couple with each other such that the satellite components 16 may report to the core component 14 with certain data (e.g., metadata) associated with test data manufacturing and usage. The core component 14 and the satellite components 16 may communicatively couple with the user interfaces 18, which may provide support for interactions between the test data management core-satellite platform 12 and the test members 20 that may use the test data for various actions (e.g., operation design, simulation, evaluation, or validation).

The core component 14 and the satellite components 16 may include various types of components that may assist the test data management core-satellite platform 12 in performing various types of tasks and operations (e.g., computations, communications). For example, the core component 14 and/or each of the satellite components 16 may include a communication component, a processor, a memory, a storage, input/output (I/O) ports, a display, and the like. The communication component may be a wireless or wired communication component that may facilitate communications between the core component 14 and the satellite components 16, and communications between the test data management core-satellite platform 12 and other components (e.g., the user interfaces 18, the test members 20) via a network (e.g., intranet, Internet, or the like). The communication component may allow the core component 14 and the satellite components 16 to obtain the data from the variety of data sources, such as the user interfaces 18, the test members 20, a variety of databases (e.g., core database, satellite database), user devices (e.g., desktop computers, laptops, smart phones, or tablets), and the like. The communication component may receive and send notifications to the user interfaces 18, the test members 20, the databases, and the user devices. The communication component may use a variety of communication protocols, such as Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The processor may process instructions for execution within the test data management core-satellite platform 12. The processor may include single-threaded processor(s), multi-threaded processor(s), or both. The processor may process instructions stored in the memory. The processor may also include hardware-based processor(s) each including one or more cores. The processor may include general purpose processor(s), special purpose processor(s), or both. The processor may be communicatively coupled to other internal components (such as the communication component, the storage, the I/O ports, and the display).

The memory and the storage may be any suitable articles of manufacture that can serve as media to store processor-executable code, data, or the like. These articles of manufacture may represent computer-readable media (e.g., any suitable form of memory or storage) that may store the processor-executable code used by the processor to perform the presently disclosed techniques. As used herein, applications may include any suitable computer software or program that may be installed onto the core component 14 and the satellite components 16, and executed by the processor. The memory and the storage may represent non-transitory computer-readable media (e.g., any suitable form of memory or storage) that may store the processor-executable code used by the processor to perform various techniques described herein. It should be noted that non-transitory merely indicates that the media is tangible and not a signal.

The I/O ports may be interfaces that may couple to other peripheral components such as input devices (e.g., keyboard, mouse), sensors, input/output (I/O) modules, and the like. The display may operate as a human machine interface (HMI) to depict visualizations associated with software or executable code being processed by the processor. In some embodiments, the display may include a touch display capable of receiving inputs from end users. The display may be any suitable type of display, such as a liquid crystal display (LCD), plasma display, or an organic light emitting diode (OLED) display, for example. It should be noted that the components described above with regard to the core component 14 and the satellite components 16 are examples and the core component 14 and/or the satellite components 16 may include additional or fewer components relative to the illustrated embodiment.

The core component 14 may include a core database. The core database may store core component data (e.g., test data templates), core component policies (e.g., ownership policy), other data or information associated with properties, attributes, or characteristics of the core component 14. In some embodiments, the core data and information may be stored in a core repository that is stored in the core database. The core component 14 may also include one or more core service components that provides a variety of core services (e.g., logging interactions or transactions). The core component 14 may further include one or more persistence layers for the core services and one or more test data management proxies. Additional details with regard to the core component 14 will be discussed below with reference to FIGS. 2-3.

Figure 7:
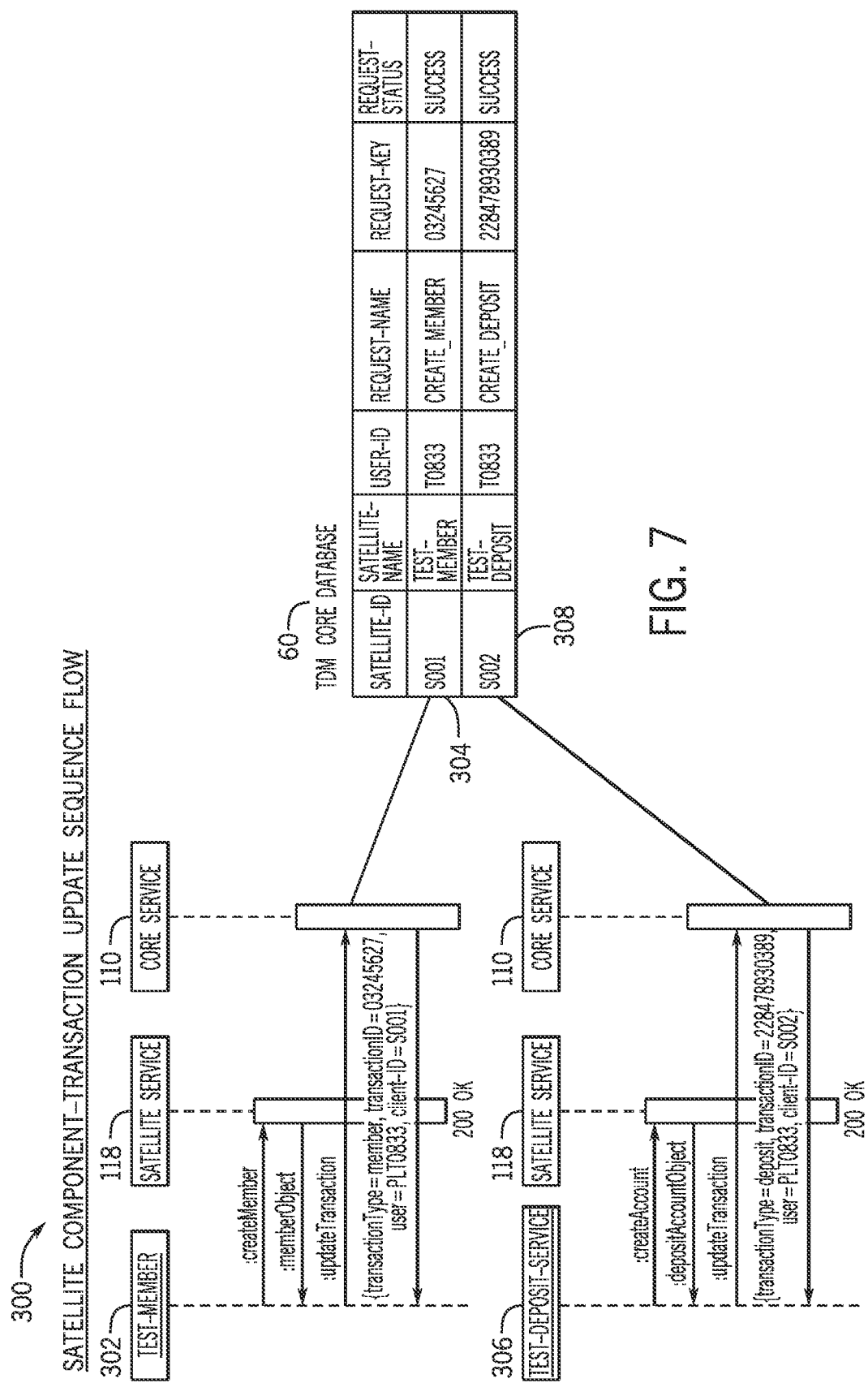
FIG. 7 illustrates an example application programming interface (API) for tracking and logging test data transactions, in accordance with embodiments described herein.

Each of the satellite components 16 may include a satellite database. The satellite database may store satellite component data, satellite component policies, other data or information associated with properties, attributes, or characteristics of the corresponding satellite component. In some embodiments, the satellite data and information may be stored in a satellite repository that is stored in the satellite database. Each of the satellite components 16 may also include one or more satellite service components that provides a variety of satellite services (e.g., manufacturing or eliminating test data). Each of the satellite components 16 may further include one or more application specific application programming interfaces (APIs), such as test data transaction APIs. Additional details with regard to the satellite components 16 will be discussed below with reference to FIGS. 2-3, and 7.

The user interfaces 18 may include a core component user interface and multiple satellite component user interfaces. The core component user interface may provide a common ground (e.g., via a landing page) allowing users to determine certain data attributes of test data to be manufactured and to access other user interfaces (e.g., the satellite user interfaces) to manufacture or remove the test data. The core component user interface may provide a variety of functionalities (e.g., sign on or authentication, starting and launching points, tracking) to facilitate interactions between the users and the core component 14. Each of the satellite component user interfaces may allow specific users (e.g., users associated with a specific sector of an organization) corresponding to a respective satellite component to manufacture new test data or remove existing test data based on specific interests or goals. Each of the satellite component user interfaces may provide various functionalities (e.g., sign on or authentication of the specific users, manufacturing, suspending, or removing test data) to facilitate interactions between the specific users and the corresponding satellite component.

The test members 20 may include various users/systems from different sectors (e.g., divisions, departments, or groups) within an organization that operate in different areas and have different roles, objectives, needs, or data structures. Each user may request for specific test data (e.g., specific data attributes and contents) to perform specific operations (e.g., design validation) to meet specific interests or goals associated with a corresponding sector. For example, a user may access, via the user interfaces 18, the core component 14 to initiate a test data manufacturing process. The core component 14 may authenticate the user and determine data attributes that meet the interests of goals of the user. The core component 14 may provide a landing page allowing the user to access one or more satellite user interfaces corresponding to one or more satellite components related to a corresponding sector associated with the user. The one or more satellite components may allow the user to manufacture the specific test data that meets the specific interests or goals associated with the corresponding sector. In some embodiments, the test members 20 may include other third-party entities (e.g., contractors) outside the organization.

It should be noted that the components described above with regard to the distributed test data management model 10 are examples and the distributed test data management model 10 may include additional or fewer components relative to the illustrated embodiment. For example, in some embodiments, the distributed test data management model 10 may include more than one core component. In some embodiments, the core component(s) or the satellite components may include corresponding user interfaces respectively.

With the foregoing in mind, and to provide further familiarity with the distributed test data management model 10 described above, FIG. 2 illustrates a block diagram of an example test data management ecosystem 50 using the distributed test data management model 10 of FIG. 1. The test data management ecosystem 50 may provide self-services for individual sectors within an organization (e.g., an enterprise), such as automatic test data generating, tracking, removing, and the like. The ecosystem test data management ecosystem 50 may utilize multiple independently owned and managed components to support and enable the scalability (e.g., flexibly and adaptively updating data in size, scale, or sharing) for the organization to manufacture, govern, track, provision, and terminate test data on demand, while maintain test data universality, versatility, diversity, and security.

In the illustrated example, the test data management ecosystem 50 may include a core component 52, multiple satellite components (e.g., satellite components 54 and 56), and multiple users (e.g., users 58A, 58B, 58C, 58D, and 58E). The core component 52 may include a core database 60 and a core component user interface containing a landing page 62. Each of the satellite components may include a variety of components, such as a satellite component user interface containing a satellite application page, one or more satellite application programming interfaces (APIs), and a satellite database. For instance, the satellite component 54 may include a satellite application page 64, a satellite application programming interface 66, and a satellite database 68. Similarly, the satellite component 56 may include a satellite application page 74, a satellite application programming interface 76, and a satellite database 78. Different satellite components may corresponding to different sectors (e.g., divisions, departments, or groups) within an organization (e.g., an enterprise). For example, the satellite component 54 may correspond to a bank division, and the satellite component 56 may correspond to an insurance division. In some embodiments, the core database 60 and/or the satellite databases (e.g., the satellite databases 68 and 78) may include distributed database(s) located in one or more networks (e.g., clouds), such that data (e.g., test data, metadata associated with the test data) may be stored in distributed ledgers (e.g., blockchains).

The core component user interface may support and facilitate interactions between the users (e.g., users 58A-E) and the core component 52. The core component user interface may include the landing page 62 for the users to determine data attributes (e.g., data type, data access right) of test data to be manufactured. Instead of providing functionalities allowing the users to directly manufacture the test data, the landing page 62 may allow the users to use the landing page 62 as a common page to access other user interfaces (e.g., satellite user interfaces) associated with other components (e.g., the satellite components 54 and 56) to manufacture the test data. The landing page 62 may provide various functionalities, such as providing sign on and authentication of users, providing starting points for the users to manufacture the test data, providing launching points to the satellite user interfaces. In some embodiments, the landing page 62 may not provide back-end services integration.

The core component 52 may include a core repository (e.g., stored in the core database 60 or a distributed core ledger) storing core component data, core component policies, other data or information associated with properties, attributes, or characteristics of the core component 52. In some embodiments, the core component data may include test data templates containing test data architecture, structure, standard, format, and so on. The core repository may allow each of the satellite components (e.g., the satellite components 54 and 56) to check in, query, and check out corresponding test data templates based on the core component policies.

In some embodiments, the core component policies may specify an ownership of the core component 52. For instance, the core component policies may specify an infrastructure team 84 that owns the core component 52. In some embodiments, the core component policies may specify relationships (e.g., architectural and structural relations, mutual data communication ports and protocols, mutual data access rights) between the core component 52 and each of the satellite components.

The core component 52 may also include one or more core service components providing a variety of core services. In some embodiments, the core services may not actually manufacture the test data. The core services may provide core functionalities or capabilities that may be requested by other components (e.g., the satellite components or the users). For example, the core services may provide functions for logging interactions or transactions (e.g., interactions or transactions between the core component 52 and the satellite components, or between the core component 52 and the users) such that the logged interactions or transactions may be tracked by the core component 52. The core functionalities may be called during any stage of a distributed test data management application or from any user interfaces (e.g., core component or satellite component user interface).

Additionally, the core component 52 may include the core database 60. The one or more core service components may access the core database 60 to facilitate operations of providing the core services to other components (e.g., the satellite components) that may not accessed the core database 60 directly. For example, the one or more core service components may access the core database 60 to receive core component data, core component policies, other data or information associated with properties, attributes, or characteristics of the core component 52. The received data or information may include test data templates that may be provided to the other components as part of the core services. The test data templates may be checked out from the core repository stored in the core database 60. The core database 60 may allow each of the satellite components (e.g., the satellite components 54 and 56) to check in, query, and check out corresponding test data templates based on the core component policies via the core services provided by the one or more core service components.

Moreover, the core component 52 may include one or more persistence layers for the core services. For example, the one or more persistence layers may provide intermediary layers between the functionalities of the core services and corresponding data (e.g., core component data, core component policies) stored in the core database 60. The persistence layer may provide object-relational mappings between the functionalities of the core services and the corresponding data.

Furthermore, the core component 52 may include one or more test data management proxies. The one or more test data management proxies may provide functions that may be requested by other components (e.g., the satellite component). For instance, the one or more test data management proxies may provide capabilities to traverse from a test data production environment to a test environment (e.g., test data validation).

Each of the satellite component user interfaces may support and facilitate interactions between the users (e.g., users 58A-E) and the corresponding satellite component (e.g., the satellite component 54 or 56). A satellite component user interface may include an application page (e.g., the satellite application page 64 or 74) providing capabilities to manufacture or remove test data. The application page may provide various functionalities, such as providing sign on or authentication of the users, providing test data manufacturing or removing functions, and the like.

Each of the satellite component may include one or more satellite application programming interfaces (APIs), such as the API 66 associated with the satellite component 54 and the API 76 associated with the satellite component 56. Each API may provide services that enables or facilitate interfaces or connections between different applications (e.g., creating a test member for a bank division, manufacturing test data for the test member, track use of the test data). Each satellite database may store corresponding specifications associated with creating and maintaining corresponding APIs.

Each of the satellite components (e.g., the satellite components 54 and 56) may include a satellite repository (e.g., stored in the satellite databases 68 and 78, or distributed satellite ledgers) storing satellite component data, satellite component policies, other data or information associated with properties, attributes, or characteristics of a corresponding satellite component. In some embodiments, the satellite component data may include test data templates checked out from the core component 52 and customized test data templates based on interests or interest variations associated with the corresponding satellite component. The satellite repository may allow the users to check in, query, and check out customized test data templates based on the satellite component policies. In some embodiments, the satellite component policies may specify an ownership of the corresponding satellite component. For instance, the satellite component policies may specify an application team 90 that owns the corresponding satellite component. The application team 90 may provide the test data manufactured by the corresponding satellite component to the users. In some embodiments, the satellite component policies may specify relationships (e.g., structural or architectural relations, mutual data communication ports and protocols, mutual data access rights) between the corresponding satellite component and other satellite components, and/or relationships between the corresponding satellite component and the users.

Each of the satellite components (e.g., the satellite components 54 and 56) may also include one or more satellite service components providing a variety of satellite services. The satellite services may include manufacturing test data for users to implement various applications based on different interests or goals (e.g., associated with different sectors within an organization), removing existing test data for the users based on variations (e.g., changed interests or goals, invalid test data, completion of test data validation), and so on. For example, one satellite service component may provide manufactured test data to support an application (e.g., a bank application using the test data) that is separated (e.g., no direct interactions) from the core component 52. In another example, a different satellite service component may provide data removal functions to remove the manufactured test data that is out of date of invalid.

Additionally, each of the satellite components may include a satellite database (e.g., satellite database 68 or 78). The one or more satellite service components may access the satellite database to facilitate operations of providing the satellite services to the users. For example, the one or more satellite service components may access the satellite database to receive satellite component data, satellite component policies, other data or information associated with properties, attributes, or characteristics of the corresponding satellite component. The received data or information may include customized test data templates that may be provided to the users as part of the satellite services. The customized test data templates may be customized based on test data template checked out from the core repository and specific interests or interest variations associated with the users.

In an embodiment, the user 58A (e.g., from a bank division) may access the core component 52 via the landing page 62 for test data. The core component 52 may request the user to provide user credentials (e.g., user name, user ID, biometric information). The core component 52 may query a database (e.g., the core database 60) to determine whether the user is a new user to the core component 52. After determining the user is a new user, the core component 52 may authenticate the user 58A based on the user credentials and data retrieved from the database. The core component 52 may further determine assess rights associated with the user 58 based on the user credentials. After authenticating the user 58A, the core component 52 may initiate (e.g., launch) a test member application user interface (e.g., an interface containing the satellite application page 64 or 74) that corresponds a specific satellite component (e.g., the satellite component 54 or 56) associated with the bank division. The user 58A may manufacture the test data via the test member application user interface, and perform various actions (e.g., operation design, validation) using the test data. The specific satellite component will monitor and report the user actions (e.g., using metadata) to the core component 52 such that the core component 52 may track the status and usage of the test data associated with the user 58A.

In another embodiment, a user may have an alternative start by accessing a satellite application page directly. For example, the user 58B may be an existing user having user credentials authenticated by the core component 52. The user 58B may directly access the satellite application page 64 using the authenticated user credentials to start actions (e.g., creating new test data, cloning existing data). The satellite component 54 may access the core component 52 to obtain data related to the actions, such as a new data template for creating the new test data).

In yet another embodiment, a user may directly access a satellite application programming interfaces (API) using authenticated user credentials to manufacture or remove test data. For example, a pre-authenticated user (e.g., the user 58D or 58E) may execute an automated test script (e.g., automated test script 86 or 88) on a user device that is coupled to a satellite API (e.g., satellite API 66 or 76). The execution of the automated test script 86 by the user 58D may cause the satellite API 66 to automatically manufacture the test data for the user 58D. The satellite API 66 may report (e.g., log) interactions (e.g., manufacturing the test data) to the TDM core component 52.

It should be noted that the components described above with regard to the test data management ecosystem 50 are examples and the test data management ecosystem 50 may include additional or fewer components relative to the illustrated embodiment. For example, the test data management ecosystem 50 may include more than two satellite components each having a different application page and one or more different satellite application programming interfaces (APIs).

Figure 2:
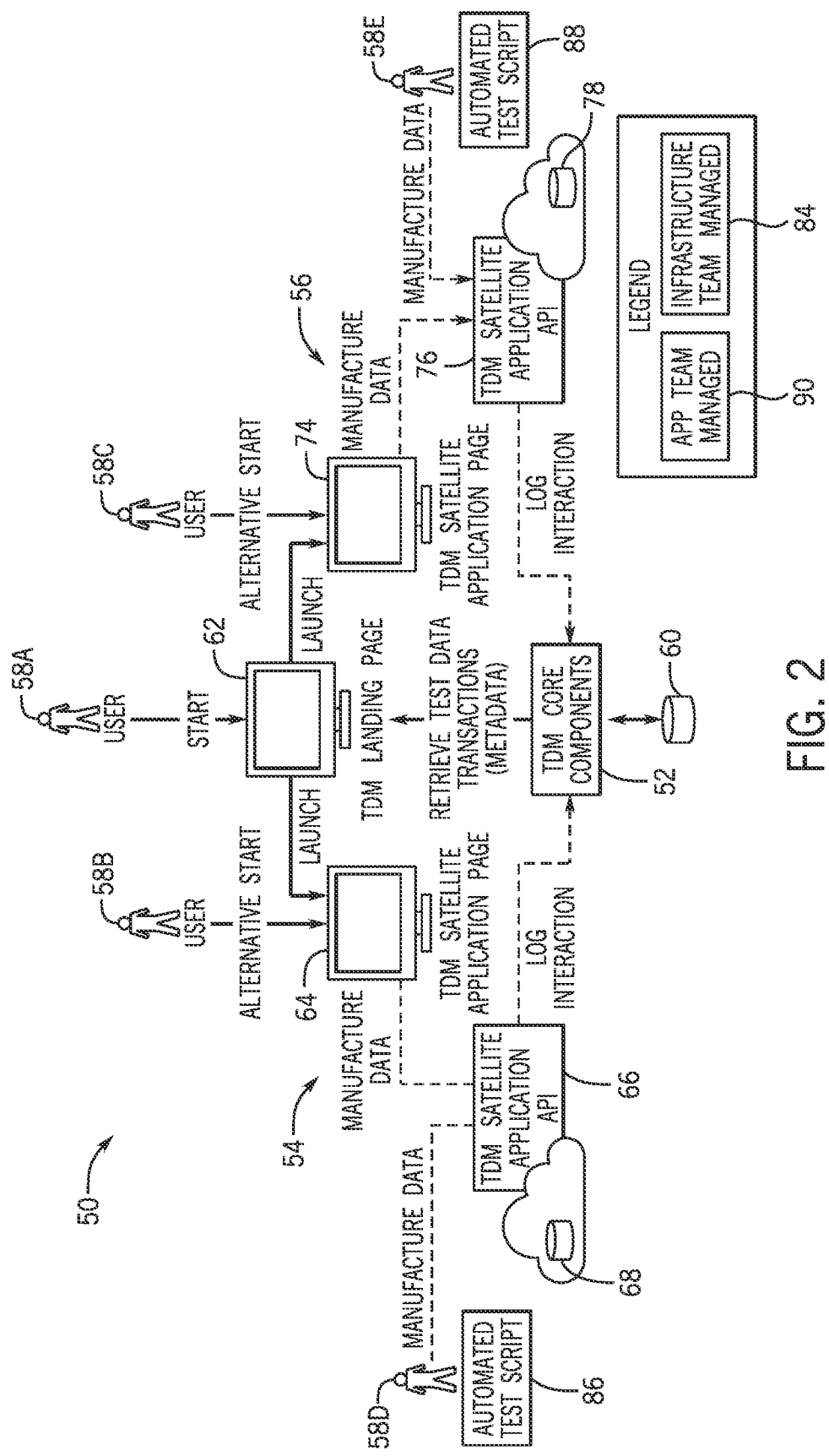
FIG. 2 illustrates a block diagram of an example test data management ecosystem using the distributed test data management model of FIG. 1, in accordance with embodiments described herein.
Figure 3:
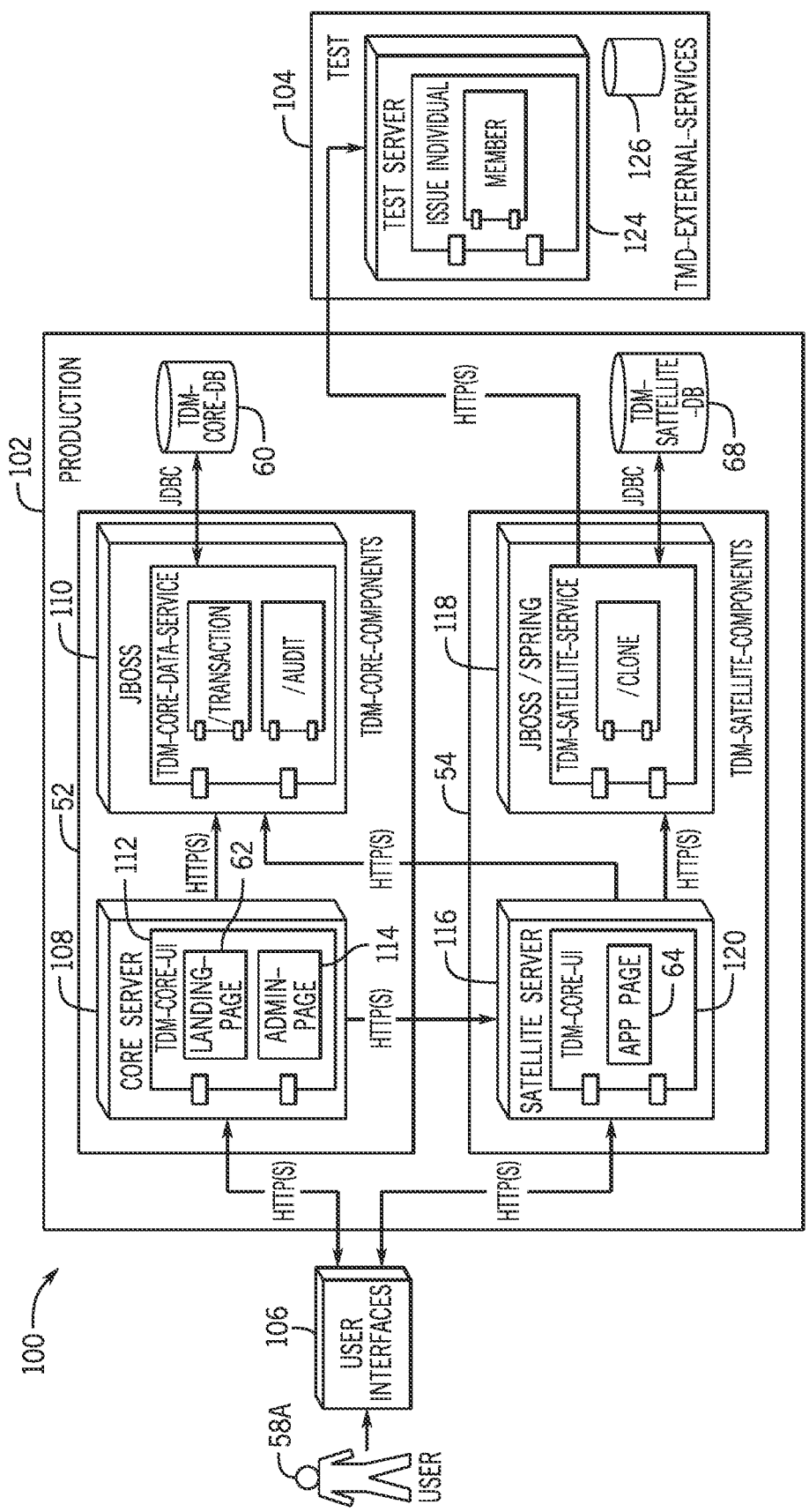
FIG. 3 illustrates a block diagram of a distributed core-satellite system architecture that may be used in the example test data management ecosystem of FIG. 2, in accordance with embodiments described herein.

By way of example, FIG. 3 illustrates a block diagram of a distributed core-satellite system architecture 100 that may be used in the example test data management ecosystem 50 of FIG. 2. Certain elements used in previous examples of FIG. 2 may be used in present example. The distributed core-satellite system architecture 100 may include a production environment 102, a test environment 104, and the user 58A that may access the production environment 102 or the test environment 104 via one or more user interfaces 106.

The production environment 102 may include the core component 52 and the satellite component 54. The core component 52 may include a core server 108 that supports the core component 52 to provide core services 110. The core server 108 may provide a core component user interface 112 that may include the landing page 62 and other pages (e.g., administration page). The core server 108 may provide hardware (e.g., communication component, processor, memory, storage, input/output (I/O) ports) and software to support the functionalities of the core component user interface 112, such as providing sign on and authentication of the user 58A, providing starting points for the user 58A to manufacture test data, providing launching points to a satellite user interface of the satellite component 54, governing and provisioning the satellite component 54, auditing transactions associate with satellite services, and so on. For example, in some embodiments, the core component user interface 112 may be used to launch various satellite component applications (e.g., test member application). The core server 108 may also provide persistence layers and test data management proxies for the core services 110. The persistence layers may include intermediary layers between the core services 110 and corresponding data (e.g., core component data, core component policies). In some embodiments, the persistence layers may include object-relational mappings between the core services 110 and the corresponding data. The test data management proxies may provide functions used by other components (e.g., the satellite component 54), such as functions to traverse from the production environment 102 to test environment 104.

The core service 110 may include logging service (e.g., logging interactions or transactions), governing service (e.g., governing satellite components), tracking service (e.g., tracking transactions), auditing service (e.g., auditing transactions). The core service 110 may allow the core component 52 to govern, track, and provision the test data associated with the user 58A throughout a lifecycle of the test data. The core database 60 may be used for data storage (e.g., storing the core component data, the core component policies, metadata containing logged or audited transactions) for the core server 108 and the core services 110.

The satellite component 54 may include a satellite server 116 that supports the satellite component 54 to provide satellite services 118. The satellite server 116 may provide the satellite component user interface 120 that may include the satellite application page 64. The satellite server 116 may provide hardware (e.g., communication component, processor, memory, storage, input/output (I/O) ports) and software to support the functionalities of the satellite component user interface 120, such as providing sign on or authentication of the user 58A, providing test data manufacturing or removing functions for the user 58A to perform various actions to meet specific interests or goals.

The satellite services 118 may include manufacturing the test data for the user 58A to implement various actions based on the specific interests or goals, removing existing test data for the user 58A based on variations (e.g., changed interests or goals, invalid test data, completion of test data validation), and the like. The satellite services 118 may allow the satellite component 54 to create and remove the test data associated with the user 58A through the lifecycle of the test data. The satellite database 68 may be used for data storage (e.g., storing the satellite component data, the satellite component policies, the test data manufactured) for the satellite server 116 and the satellite services 118.

The user 58A may access, via the user interfaces 106, the core server 108 to receive the core services 110 and the satellite server 116 to receive the satellite services 118. The core services 110 and the satellite services 118 may allow the user 58A to manufacture the test data. After the test data is manufactured, the core services 110 and the satellite services 118 may allow the user 58A to traverse from the production environment 102 to test environment 104 based on the test data management proxies.

The test environment 104 may include a test server 124 and a test database 126. The test server 124 may provide external services, such as validating the test data, performing simulations (e.g., validating operation designs) using the test data in the test environment 104, and so on. The test database 126 may store data associated with the external services. In some embodiments, the test server 124 may be associated with a third-party entity (e.g., contractor).

Various components and services described above and associated with the distributed core-satellite system architecture 100, such as the user interfaces 106, the core server 108, the core services 110, the satellite server 116, the satellite services 118, and the test server 124, may communicate with each other via various communication components (e.g., communication ports) and protocols. For example, in the illustrated embodiment, the various components and services may communicate with each other using Hypertext Transfer Protocol (HTTP) or Hypertext Transfer Protocol Secure (HTTPS) that provides secure communication over a network (e.g., internet or intranet).

It should be noted that the components described above with regard to the distributed core-satellite system architecture 100 are examples and the distributed core-satellite system architecture 100 may include additional or fewer components relative to the illustrated embodiment. For example, in some embodiments, the distributed core-satellite system architecture 100 may include additional circuitry that may include artificial intelligence circuitry (e.g., neural network circuitry) for provide additional capabilities (e.g., advanced learnings and/or simulations to facilitate data communication, monitoring, governing, security). In some embodiments, the distributed core-satellite system architecture 100 may use other communication protocols than the HTTP or HTTPS.

Figure 4:
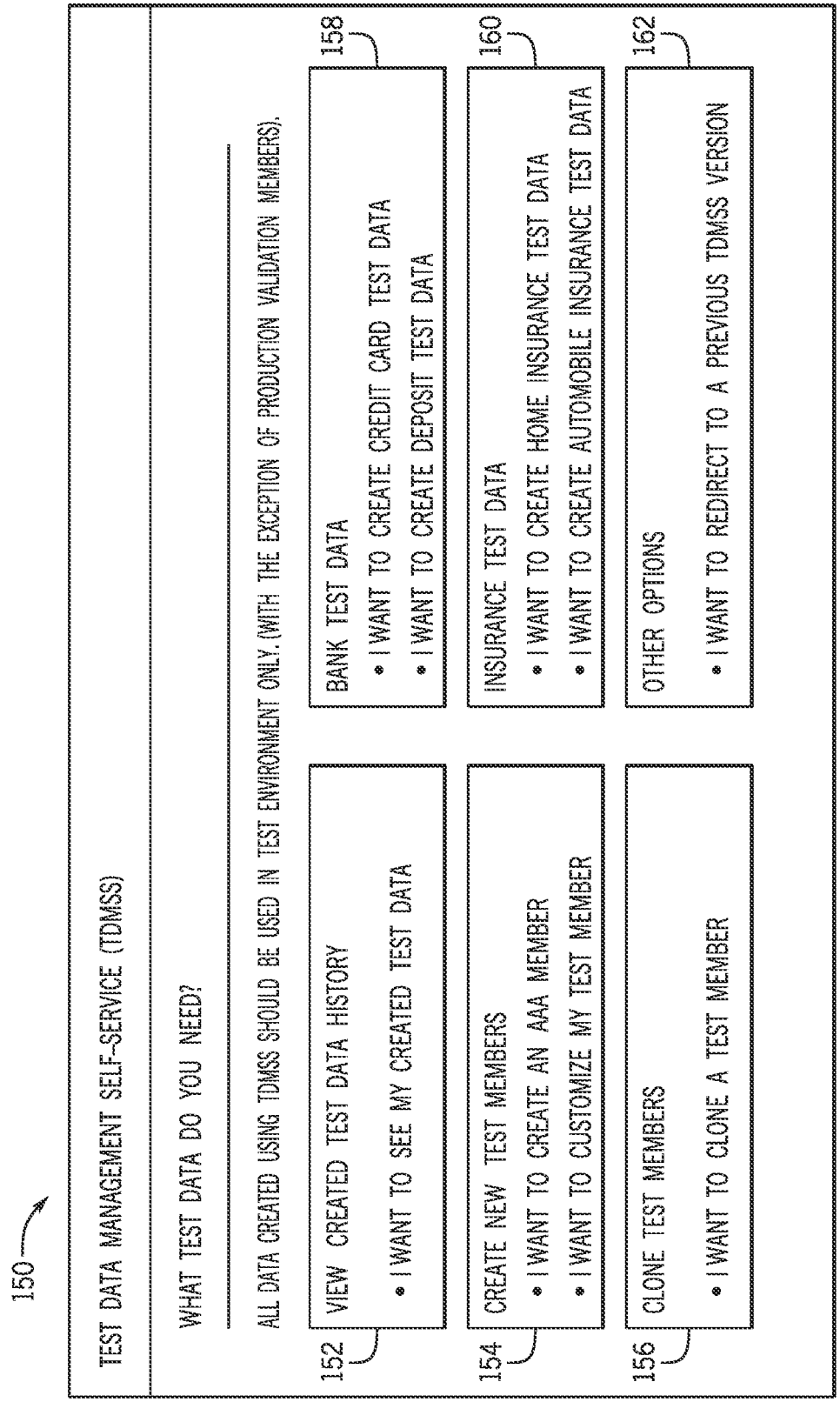
FIG. 4 illustrates an example graphical user interface (GUI) presented on a landing page of a core component application, in accordance with embodiments described herein.

With the preceding in mind, and to provide further familiarity with the distributed core-satellite system architecture 100 described above, FIG. 4 illustrates an example user interface 150 presented on a landing page (e.g., the landing page 62) of a core component application. A core server (e.g., the core server 108) may authenticate a user and determine access rights associated with the user based on user credentials (e.g., user name, user ID, biometric information). The core server may launch the user interface 150 for the user to determine test data to be manufactured, such as data attributes (e.g., data type, data access right for sharing) of the test data. The user interface 150 may provide administration and policy information for the user. For example, the user interface 150 may indicate that the test data to be manufactured may be used in a test environment (e.g., the test environment 104) only, with an exception for certain production validation members. The user interface 150 may provide various options allowing the user to select based on user's specific interests or goals. For instance, the user interface 150 may provide an option 152 to enable the user to view created test data history (e.g., test data created by the user previously). The user may select an option 154 to create new a test member (e.g., using a new test data template) or customize an existing test member created by the user previously. Alternatively, the user may select an option 156 to clone a test member (e.g., from a previously created test member). The user interface 150 may also provide options allowing the user to select a specific test data type from a variety of test data types. For example, the user may select an option 158 to create bank test data (e.g., credit card test data, deposit test data), or an option 160 to create insurance test data (e.g., home insurance test data, automobile insurance test data). Additionally, the user interface 150 may provide other options 162, such as an option allowing the user to redirect to a previous test data management self-service version.

As mentioned previously, instead of providing functionalities allowing the user to directly manufacture the test data, the user interface 150 may allow the user to use the user interface 150 as a common page to access other user interfaces (e.g., the satellite user interface 120 containing the application page 64) to manufacture or remove the test data. The user interface 150 may provide functionalities (e.g., sign on and authentication, starting points for manufacturing the test data, providing launching points to the satellite user interface 120).

Figure 5:
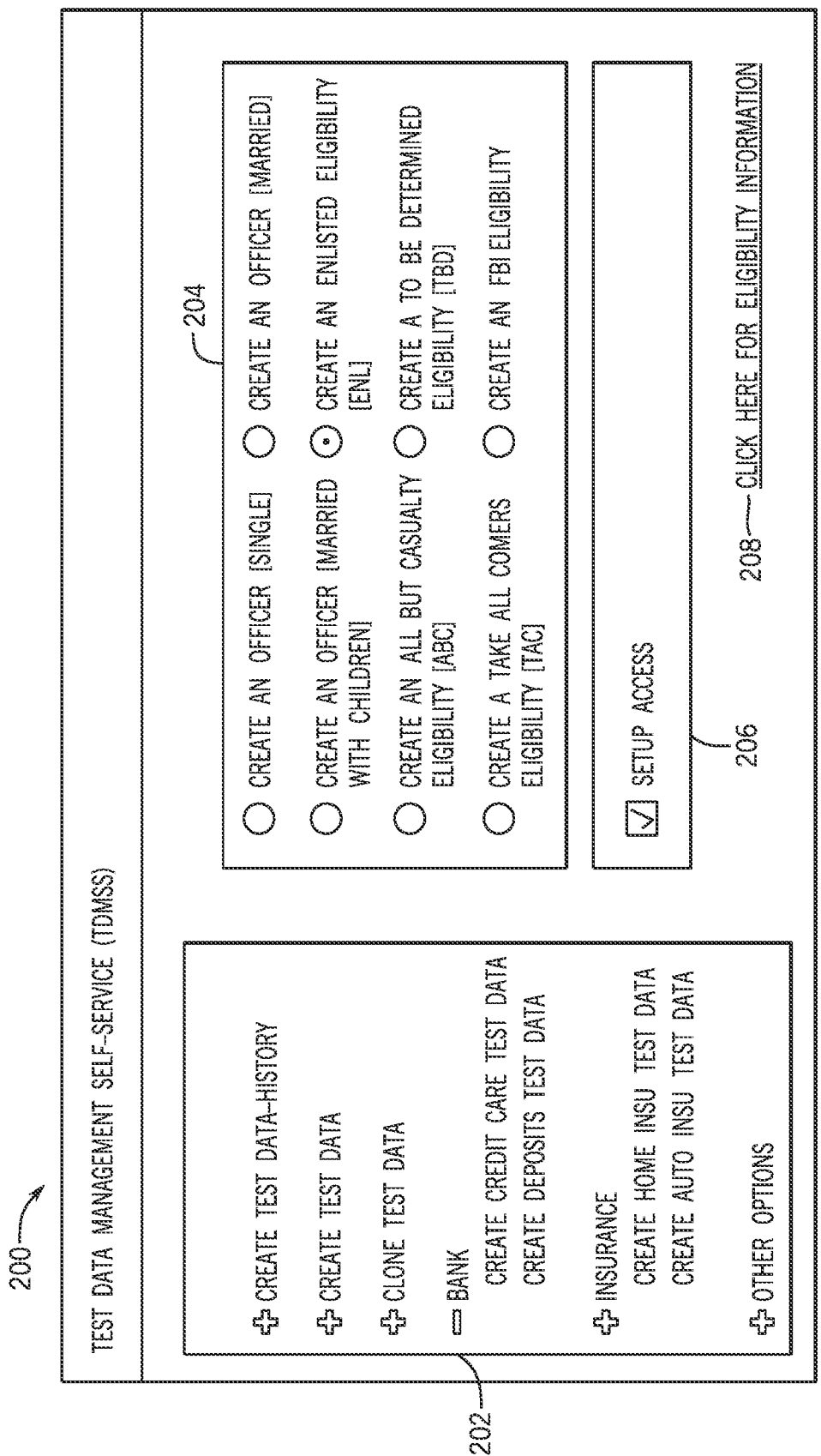
FIG. 5 illustrates an example graphical user interface (GUI) presented on a satellite page of a satellite component application, in accordance with embodiments described herein.

With the preceding in mind, FIG. 5 illustrates an example user interface 200 presented on a satellite page (e.g., the application page 64) of a satellite component application. A satellite server (e.g., the satellite server 116) may authenticate a user and determine access rights associated with the user based on user credentials (e.g., user name, user ID, biometric information). The satellite server may launch the user interface 200 for the user to create test data based on user's specific interests or goals. The user interface 200 may provide various options allowing the user to select based on the user's specific interests or goals. For instance, the user interface 200 may provide the user with a series of options 202, such as an option to view created test data history, an option to create test data or clone test data, an option to create bank test data, an option to create insurance test data, and other options that may match with the user's specific interests or goals. In the illustrated embodiment, the user may select the option to create the bank test data. Furthermore, under the selected option, the user may select a sub-option to create deposit test data. The user interface 200 may also provide other options 204 for the user to create the test data that matches detailed interests or goals, such as an option to create an officer (single, married, or married with children), an option to create an all but casualty eligibility (ABC), an option to create a take all comers (TAC), an option to create an enlisted eligibility (ENL), an option to create a to be determined eligibility (TBD), and so on. Additionally, the user interface 200 may provide an option 206 to allow the user to set up access(es) to the test data created. Such access(es) may allow the user to govern data sharing with other users. In some embodiments, the user interface 200 may provide additional functions 208, such as allowing the user to click for eligibility information (e.g., information associated with access rights).

Figure 6:
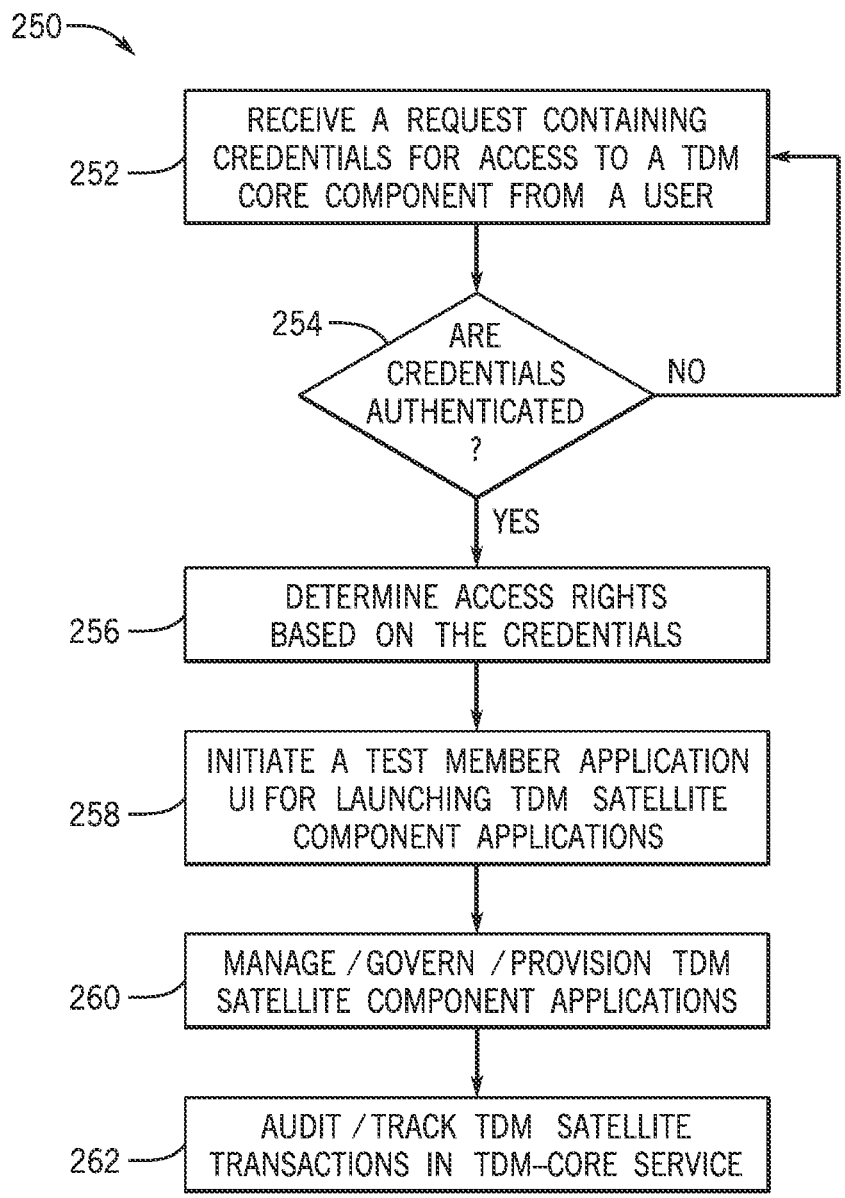
FIG. 6 illustrates a block diagram of an example process for providing test data management to govern satellite component applications using the distributed core-satellite system architecture of FIG. 3, in accordance with embodiments described herein.

With the foregoing in mind, FIG. 6 illustrates a block diagram of an example method 250 for providing test data management to govern satellite component applications using the distributed core-satellite system architecture 100 of FIG. 3. A computing device (e.g., the core server 108) may perform operations described below via a processor based on processor-executable code stored in a memory or a storage media. The processor may execute the processor-executable code to perform operations, such as receiving a request from a user for access a core component (e.g., the core component 52), authenticating user's credentials, determining access rights associated with the user, launching and governing a satellite component application, auditing and tracking transactions associated with test data, and so on.

Although the method 250 described in FIG. 6 is described in a particular order, it should be noted that the method 250 may be performed in any suitable order and is not limited to the order presented herein. It should also be noted that although each processing block is described below in the method 250 as being performed by the computing device (e.g., the core server 108), other suitable computing devices (e.g., two or more coordinated servers) may perform the methods described herein.

Referring now to FIG. 6, at block 252, the core server 108 may receive a request containing credentials for access to a test data management core component (e.g., the core component 52) from a user. For instance, the core server 108 may receive the request via a communication port. The request may include user credentials, such as user name, user ID, and biometric information.

After receiving the request containing the user credentials, at block 254, the core server 108 may determine whether the user credentials are authenticated. For example, the core server 108 may query the core database 60 to determine whether the user is a new user to the core component 52. After determining the user is a new user, the core server 108 may authenticate the user based on the user credentials and data retrieved from the core database 60. In some embodiments, the core server 108 may send a confirmation request (e.g., confirming user's identity, confirming user's authorization for accessing test data) to a sector (e.g., divisions, departments, or groups) associated with the user and authenticate the user based on feedbacks from the sector.

At block 256, the core server 108 may determine assess rights associated with the user based on the user credentials.

For example, the core server 108 may determine whether the user has a right to create the test data as requested, whether the user has a right to access certain previously created test data, whether the user has a right to clone the test data based on certain previously created test data, and the like.

After determining the access rights, at block 258, the core server 108 may initiate a test member application user interface (e.g., an interface containing the satellite application page 64) for launching a test data management satellite component application. For example, the test member application user interface may correspond to a specific satellite component (e.g., the satellite component 54) associated with an insurance division. The user may manufacture the test data (e.g., insurance test data) via the test member application user interface and perform various actions (e.g., insurance operation design, insurance test data validation) using the test data.

At block 260, the core server 108 may manage, govern, and provision the test data management satellite component application. For example, the specific satellite component may monitor, log, and report user actions (e.g., manufacturing the test data, using the test data, removing the tests data) to the core server 108 using metadata (e.g., data containing logged transactions). Based on the metadata provided by the specific satellite component, the core server 108 may audit and track actions associated with the test data management satellite component application (block 262). For instance, the core server 108 may enable the core component 52 to track status and usage of the test data associated with the user throughout a lifecycle of the test data.

With the preceding in mind, and to provide further familiarity with the method 250 described above, FIG. 7 illustrates an example application programming interface (API) 300 for tracking and logging test data transactions. A computing device (e.g., the core server 108) may receive a request from a user for create a test member 302. The core server 108 may authenticate the user and initiate a test member application user interface (e.g., an interface containing the satellite application page 64) for launching a test data management satellite component application. The test data management satellite component application may provide the satellite services 119 for the user, such as creating the test member (e.g., a test member object). The satellite services 118 may also include creating a transaction 304 associated with the creation of the test member. The transaction 304 may be transmitted via another computing device (e.g., the satellite server 116) to the core server 108. The transaction 304 may include satellite ID (e.g., S001), satellite name (e.g., test member), user ID (e.g., T0833), request name (e.g., create member), request key (e.g., 03245627), and so on. The core server 108 may audit the transaction 304 and send a request status (e.g., success) or request status code (e.g., 200) to the test member 302 via the core services 110. The core services 110 may also include updating the transaction 304 (e.g., adding the request status).

After creating the test member 302, the user may send a request to the satellite server 116 to create deposit test data. The satellite server 116 may provide the satellite services 119 that include a test deposit service 306 to enable the user to use the deposit test data. For example, the test deposit service 306 may allow the user to create a deposit account. After the deposit account is created, the satellite services 118 may creating a transaction 308 associated with the creation of the deposit account. The transaction 308 may be transmitted via the satellite server 116 to the core server 108. The transaction 308 may include the satellite ID (e.g., S002), the satellite name (e.g., test deposit), the user ID (e.g., T0833), the request name (e.g., create deposit), the request key (e.g., 228478930389), and so on. The core server 108 may audit the transaction 308 and send the request status (e.g., success) or the request status code (e.g., 200) to the test member 302 via the core services 110. The core services 110 may also include updating the transaction 308 (e.g., adding the request status).

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A system, comprising:
a test data management (TDM) system configured to create one or more test datasets, comprising:
a core component comprising: a core component interface, a core database, and a hardware processor configured to:
authenticate an access right of a user to access the core component and test dataset creation access rights with respect to a plurality of satellite components;
in response to authenticating the access right of the user and the test dataset creation access rights, initiate, via the core component interface, a landing page enabling the user to access the plurality of satellite components to selectively create the one or more test datasets;
receive and track transactions associated with the one or more test datasets, wherein the transactions are received from the plurality of satellite components and are stored in the core database, based upon actions associated with the one or more test datasets that are performed at the plurality of satellite components; and
provide to the landing page a status indication associated with the one or more test datasets, based upon the tracking of the transactions to cause the landing page to display the status indication; and
the plurality of satellite components each comprising: a corresponding satellite component, a corresponding satellite component interface, a corresponding of satellite database, and a corresponding processor configured to:
in response to an indication to selectively create a corresponding test dataset, create and store the corresponding test dataset in the corresponding satellite database;
in response to identifying an action associated with the corresponding test dataset being performed at the corresponding satellite component, log a transaction indicating the action; and
transmit the transaction to the core component.

2. The system of claim 1, wherein the core component comprises a core repository storing core component data and core component policies associated with properties, attributes, or characteristics of the core component.

3. The system of claim 2, wherein the core repository is configured to enable the plurality of satellite components to check in, query, and check out a plurality of test data templates stored in the core component data, wherein the plurality of satellite components is configured to check in, query, and check out the plurality of test data templates based on the core component policies.

4. The system of claim 3, wherein the plurality of test data templates comprises data architecture, structure, standard, and format associated with the one or more test datasets.

5. The system of claim 2, wherein the core repository is stored in the core database or a distributed ledger.

6. The system of claim 2, wherein the core component comprises one or more persistence layers providing intermediary layers comprising object-relational mappings between the core component interface and the core component data.

7. The system of claim 1, wherein the core component comprises a plurality of test data management proxies used by the plurality of satellite components.

8. The system of claim 7, wherein the plurality of test data management proxies is configured to enable a traverse from a production environment to a test environment.

9. The system of claim 1, wherein the landing page is configured to allow the user to determine a plurality of data attributes of the corresponding test dataset.

10. The system of claim 1, wherein the access right of the user comprises user name, user ID, biometric information associated with the user.

11. The system of claim 1, wherein the core component is configured to determine the test dataset creation access rights based at least on the access right of the user.

12. The system of claim 1, wherein the plurality of satellite components is configured to remove the one or more test datasets from the corresponding satellite database.

13. The system of claim 1, wherein metadata allows the core component to become aware of the one or more test datasets and provide an indication to the user.

14. A tangible, non-transitory computer-readable medium, comprising computer-readable instructions that, when implemented by one or more processors of one or more computers, cause the one or more computers to:
authenticate an access right of a user to access a core component and test dataset creation access rights with respect to a plurality of satellite components;
in response to authenticating the access right of the user and the test dataset creation access rights, initiate, via a first user interface, a landing page enabling the user to access a plurality of interfaces to selectively create one or more test datasets;
receive metadata comprising transactions associated with the one or more test datasets;
receive and track the transactions, wherein the transactions are received from the plurality of satellite components and are stored in a core database, based upon actions associated with the one or more test datasets that are performed at the plurality of satellite components; and
provide to the landing page a status indication associated with the one or more test datasets, based upon the tracking of the transactions to cause the landing page to display the status indication.

15. The tangible, non-transitory computer-readable medium of claim 14, wherein the instructions that, when implemented by the one or more processors of the one or more computers, cause the one or more computers to:
manufacture or remove, via a plurality of user interfaces, the one or more test datasets and store the one or more test datasets in a plurality of databases;
log the transactions;
create the metadata based on the transactions; and
transmit the metadata.

16. The tangible, non-transitory computer-readable medium of claim 15, wherein the landing page is configured to enable the user to access the plurality of user interfaces to manufacture or remove the one or more test datasets.

17. The tangible, non-transitory computer-readable medium of claim 14, wherein the instructions that, when implemented by the one or more processors of the one or more computers, cause the one or more computers to:
validate the one or more test datasets in a test environment; and
perform simulations using the one or more test datasets in the test environment.

18. The tangible, non-transitory computer-readable medium of claim 17, wherein the instructions that, when implemented by the one or more processors of the one or more computers, cause the one or more computers to:
enable a traverse from a production environment to the test environment based on a plurality of test data management proxies.

19. A computer implemented method, comprising:
authenticating an access right of a user to access a core component and test dataset creation access rights with respect to a plurality of satellite components;
in response to authenticating the access right of the user and the test dataset creation access rights, initiating, via a core component interface, a landing page enabling the user to access the plurality of satellite components to selectively create one or more test datasets;
receiving and tracking transactions associated with the one or more test datasets, wherein the transactions are received from the plurality of satellite components and are stored in a core database, based upon actions associated with the one or more test datasets that are performed at the plurality of satellite components; and
providing to the landing page a status indication associated with the one or more test datasets, based upon the tracking of the transactions to cause the landing page to display the status indication.

20. The computer implemented method of claim 19, comprising:
manufacturing or removing, via a satellite component interface, the one or more test datasets;
logging the transactions;
creating metadata comprising the transactions; and
transmitting the metadata.

* * * * *